US007968827B2

(12) United States Patent
Adams et al.

(10) Patent No.: US 7,968,827 B2

(45) Date of Patent: Jun. 28, 2011

(54) OXYGEN SENSOR HEATER CONTROL STRATEGY

(75) Inventors: Justin F. Adams, Ypsilanti, MI (US); Louis A. Avallone, Milford, MI (US); Dale W. McKim, Howell, MI (US); Jeffrey A. Sell, West Bloomfield, MI (US); John W. Siekkinen, Novi, MI (US); Julian R. Verdejo, Farmington, MI (US)

(73) Assignee: GM Global Technology Operations LLC

( * ) Notice: Subject to any disclaimer, the term of this patent is extended or adjusted under 35 U.S.C. 154(b) by 475 days.

(21) Appl. No.: 12/132,653

(22) Filed: Jun. 4, 2008

(65) Prior Publication Data

US 2009/0150057 A1 Jun. 11, 2009

Related U.S. Application Data

(60) Provisional application No. 61/012,158, filed on Dec. 7, 2007.

(51) Int. Cl.

| | |
|---|---|
| ***F01N 3/00*** | (2006.01) |
| ***H05B 1/02*** | (2006.01) |
| ***G01N 7/00*** | (2006.01) |
| *G06F 7/00* | (2006.01) |
| *G01N 21/00* | (2006.01) |
| *G01N 25/00* | (2006.01) |
| *F02D 41/00* | (2006.01) |

(52) U.S. Cl. ............ 219/494; 701/109; 60/276; 60/277; 60/285; 60/286; 422/83; 73/1.03; 73/1.06; 73/23.21; 73/23.31; 73/23.32; 436/136; 436/137; 123/697; 123/672; 123/685; 123/693; 123/703; 165/287; 165/295

(58) Field of Classification Search .................... 73/1.03

See application file for complete search history.

(56) References Cited

U.S. PATENT DOCUMENTS

| | | | | |
|---|---|---|---|---|
| 5,590,521 | A * | 1/1997 | Schnaibel et al. | 60/274 |
| 2002/0179443 | A1 * | 12/2002 | Hada et al. | 204/408 |
| 2007/0113539 | A1 * | 5/2007 | Nakano | 60/276 |
| 2008/0060350 | A1 * | 3/2008 | Ament et al. | 60/295 |
| 2009/0133464 | A1 * | 5/2009 | Sell et al. | 73/1.03 |

* cited by examiner

*Primary Examiner* — In Suk Bullock
*Assistant Examiner* — Jennifer Wecker

(57) ABSTRACT

A heating module for an oxygen sensor comprises an estimated mass module, a cumulative mass module, and a temperature control module. The estimated mass module determines an estimated mass of intake air to remove condensation from an exhaust system after startup of an engine. The cumulative mass module determines a cumulative mass of intake air after the engine startup. The temperature control module adjusts a temperature of an oxygen sensor measuring oxygen in the exhaust system to a first predetermined temperature after the engine startup and adjusts the temperature to a second predetermined temperature when the cumulative air mass is greater than the estimated air mass, wherein the second predetermined temperature is greater than the first predetermined temperature.

24 Claims, 4 Drawing Sheets

OXYGEN SENSOR HEATER CONTROL STRATEGY

CROSS-REFERENCE TO RELATED APPLICATIONS

This application claims the benefit of U.S. Provisional Application No. 61/012,158, filed on Dec. 7, 2007. The disclosure of the above application is incorporated herein by reference.

FIELD

The present disclosure relates to internal combustion engines and more specifically to oxygen sensor control.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a functional block diagram of an engine system 100 is presented. Air is drawn into an engine 102 through an intake manifold 104. A throttle valve 106 varies the volume of air drawn into the intake manifold 104. The air mixes with fuel from one or more fuel injectors 108 to form an air and fuel (A/F) mixture. The A/F mixture is combusted within one or more cylinders of the engine 102, such as cylinder 110. In various engine systems, such as the engine system 100, combustion may be initiated by spark from a spark plug 112. Resulting exhaust is expelled from the cylinders to an exhaust system 114.

The exhaust system 114 includes an oxygen sensor 116 that measures and outputs the concentration of oxygen in the exhaust. The oxygen sensor 116 includes a heater that receives power from a heater power supply 118. The heater may be used to bias the oxygen sensor 116 to within an operating temperature range.

An engine control module (ECM) 120 receives the output of the oxygen sensor 116 and may receive signals from other sensors 122. The other sensors 122 may include, for example, a manifold absolute pressure (MAP) sensor and intake air temperature (IAT) sensor. The ECM 120 controls the A/F mixture based on the output of the oxygen sensor 116. Additionally, the ECM 120 may control the A/F mixture based on the signals from the other sensors 122.

The temperature of the oxygen sensor 116 is likely low when the engine 102 is started. Accordingly, the output of the oxygen sensor 116 is likely unreliable after engine startup. When the output of the oxygen sensor 116 is unreliable, the ECM 120 may control the A/F mixture independent of the output of the oxygen sensor 116.

The ECM 120 may estimate that the output of the oxygen sensor 116 will be reliable when a timer expires after the output leaves a calibratable voltage window. For example, the ECM 120 may estimate that the output of the oxygen sensor 116 will be reliable twenty (20) seconds after the output leaves the voltage window. In such implementations, the ECM 120 may estimate that the output of the oxygen sensor 116 will be reliable approximately thirty-five (35) seconds after engine startup.

SUMMARY

A heating module for an oxygen sensor comprises an estimated mass module, a cumulative mass module, and a temperature control module. The estimated mass module determines an estimated mass of intake air to remove condensation from an exhaust system after startup of an engine. The cumulative mass module determines a cumulative mass of intake air after the engine startup. The temperature control module adjusts a temperature of an oxygen sensor measuring oxygen in the exhaust system to a first predetermined temperature after the engine startup and adjusts the temperature to a second predetermined temperature when the cumulative air mass is greater than the estimated air mass, wherein the second predetermined temperature is greater than the first predetermined temperature.

In further features, the heating module further comprises an average mass airflow (MAF) module and a reduction determination module. The average MAF module determines an average MAF based on the cumulative air mass over a period of time. The reduction determination module determines a reduction factor based on the average MAF. The estimated mass module reduces the estimated air mass based on the reduction factor.

In other features, the period is based on the engine startup. The estimated air mass is determined based on a coolant temperature. In other features, the estimated air mass is a predetermined value. The cumulative air mass is determined based on a measured mass of intake air. The temperature control module adjusts the temperature of the oxygen sensor by instructing a heater power supply to adjust at least one of a voltage and a current applied to a heater of the oxygen sensor.

In still other features, the estimated air mass is determined to remove condensation from an interior surface of the exhaust system after the engine startup. The interior surface comprises a surface within the exhaust system between the engine and the oxygen sensor.

A system comprises an engine control module that comprises the heating control module and the oxygen sensor that comprises a heater. The engine control module selectively adjusts an operating parameter of the engine based on an output of the oxygen sensor. The engine control module determines the temperature of the oxygen sensor and adjusts the operating parameter when the temperature is greater than the first predetermined temperature. The engine control module determines the temperature based on a resistance of the heater.

A method comprises determining an estimated mass of intake air to remove condensation from an exhaust system after startup of an engine, determining a cumulative mass of intake air after the engine startup, adjusting a temperature of an oxygen sensor measuring oxygen in the exhaust system to a first predetermined temperature after the engine startup, and adjusting the temperature to a second predetermined temperature when the cumulative air mass is greater than the estimated air mass, wherein the second predetermined temperature is greater than the first predetermined temperature.

In other features, the method further comprises determining an average mass airflow (MAF) based on the cumulative air mass over a period of time, determining a reduction factor based on the average MAF, and reducing the estimated air mass based on the reduction factor. The period is based on the engine startup. The estimated air mass is determined based on a coolant temperature.

In still other features, the estimated air mass is a predetermined value. The cumulative air mass is determined based on a measured mass of intake air. In further features, adjusting the temperature of the oxygen sensor comprises instructing a heater power supply to adjust at least one of a voltage and a current applied to a heater of the oxygen sensor.

In further features, the estimated air mass is determined to remove condensation from an interior surface of the exhaust system after the engine startup. The interior surface comprises a surface within the exhaust system between the engine and the oxygen sensor. The method further comprises selectively adjusting an operating parameter of the engine based on an output of the oxygen sensor.

In still further features, the method further comprises determining the temperature of the oxygen sensor and adjusting the operating parameter when the temperature is greater than the first predetermined temperature. The temperature is determined based on a resistance of a heater of the oxygen sensor.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
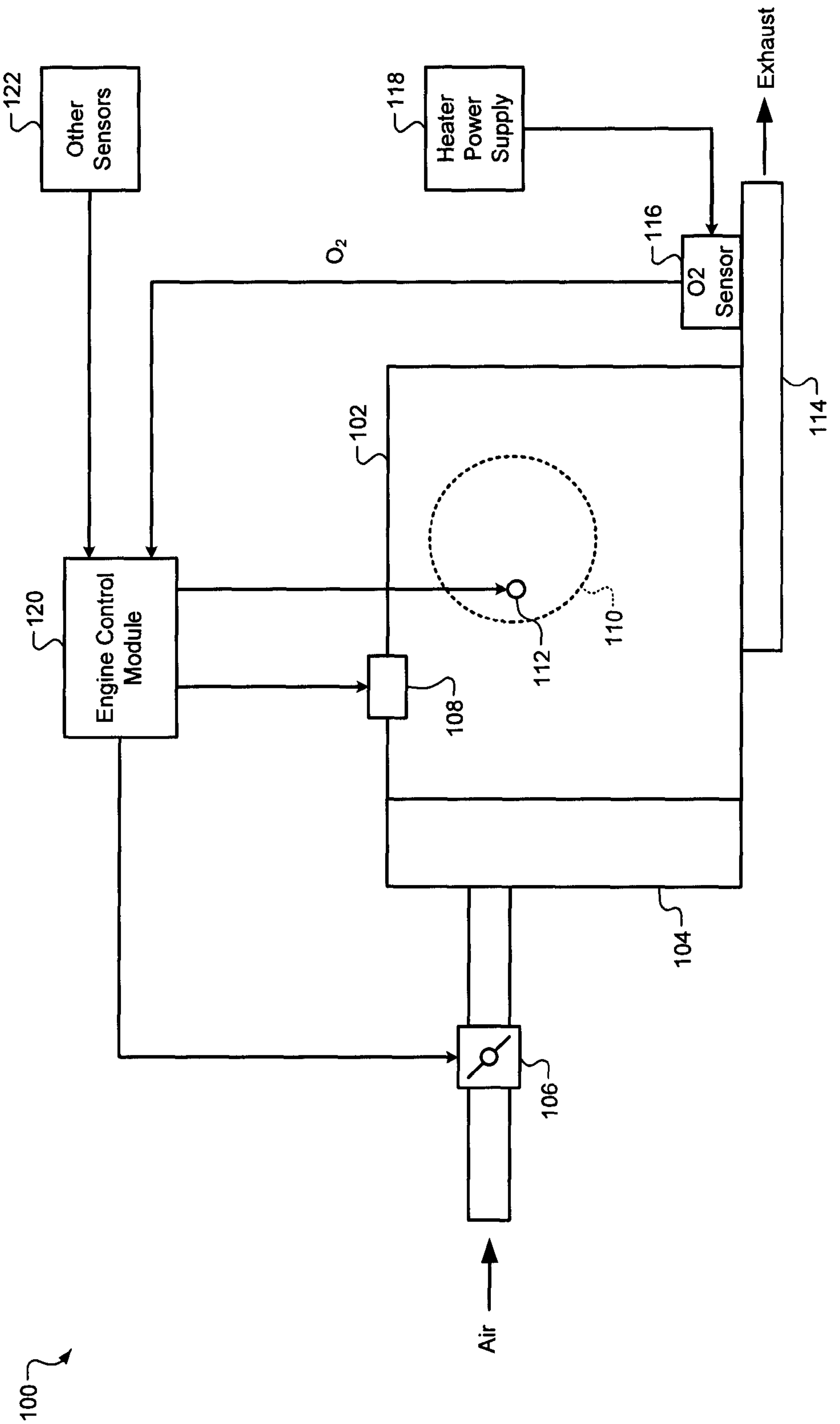
FIG. 1 Prior Art
FIG. 1 is a functional block diagram of an engine system according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

An oxygen sensor measures and outputs the concentration of oxygen an exhaust system. An engine controller regulates an air/fuel (A/F) mixture based on the output of the oxygen sensor. After an engine is started, however, the output of the oxygen sensor may be unreliable as the temperature of the oxygen sensor is likely low. Accordingly, the engine controller may wait to begin using the output until the output becomes reliable.

A heater power supply applies power to a heater of the oxygen sensor to heat the oxygen sensor after engine startup. This heat may allow the output of the oxygen sensor to become reliable as soon as possible after the engine is started. Like the temperature of the oxygen sensor, the temperature of the exhaust system, and more specifically an interior surface of the exhaust system, is likely low after engine startup.

Exhaust produced by combustion within the engine includes vapor. The temperature of the exhaust is likely greater than the temperature of the interior surface of the exhaust system after engine startup. If the temperature of the interior surface is less than the dew point of the exhaust, vapor passing the interior surface will condense. Condensation, therefore, will likely be present on the interior surface after starting the engine and condensation may contact the oxygen sensor. However, the oxygen sensor may be damaged if it is contacted by condensation when the temperature of the oxygen sensor is greater than a first temperature.

The engine controller adjusts the temperature of the oxygen sensor to the first temperature after starting the engine. As the engine runs, air is ingested, and heat generated by combustion increases the temperature of the interior surface. Once the temperature of the interior surface reaches the dew point of the exhaust, it is likely that vapor passing the interior surface will no longer condense. Any further temperature increase of the interior surface temperature will likely cause condensation on the interior surface to evaporate.

The engine controller determines an estimated mass of air to be ingested by the engine to remove condensation from the exhaust system after the engine is started. Once the cumulative mass of air drawn into the engine after engine startup is greater than the estimated air mass, the engine controller adjusts the temperature of the oxygen sensor to a second temperature. In this manner, the engine controller waits to increase the temperature of the oxygen sensor to the second temperature until condensation has been removed from the exhaust system.

The engine controller may begin using the output of the oxygen sensor when the temperature of the oxygen sensor reaches the second temperature. However, in some implementations, the engine controller may be able to use the output after the temperature reaches the first temperature.

Figure 2:
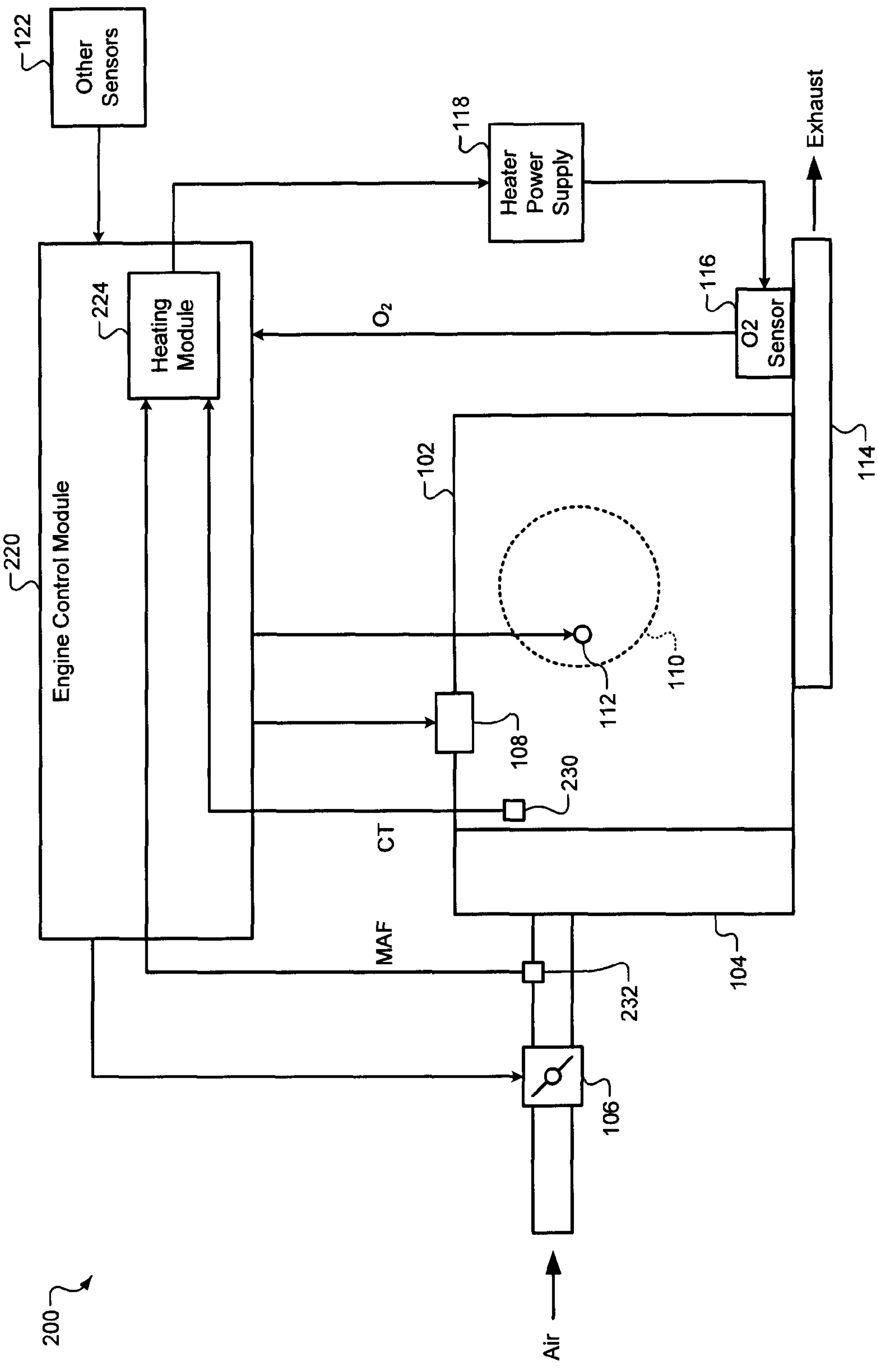
FIG. 2 is a functional block diagram of an exemplary engine system according to the principles of the present disclosure.

Referring now to FIG. 2, a functional block diagram of an exemplary engine system 200 is presented. The engine system 200 includes the engine 102 that combusts an air/fuel (A/F) mixture to produce drive torque for a vehicle. Air is drawn into the intake manifold 104 through the throttle valve 106. An engine control module (ECM) 220 regulates opening of the throttle valve 106 to control the amount of air drawn into the intake manifold 104.

Air from the intake manifold 104 is drawn into cylinders of the engine 102. While the engine 102 may include multiple cylinders, for illustration purposes, the single representative cylinder 110 is shown. For example only, the engine 102 may include 2, 3, 4, 5, 6, 8, 10, or 12 cylinders. The ECM 220 also controls the amount of fuel injected by the fuel injector 108. The fuel injector 108 may inject fuel into the intake manifold 104 at a central location or at multiple locations, such as near an intake valve (not shown) of each of the cylinders. Alternatively, the fuel injector 108 may inject fuel directly into the cylinders. In various implementations, one fuel injector may be provided for each cylinder.

The injected fuel mixes with the air and creates the A/F mixture. A piston (not shown) compresses the A/F mixture within the cylinder 110. In various implementations, combustion of the A/F mixture may be initiated by spark from the spark plug 112. Alternatively, the engine 102 may be any suitable type of engine, such as a compression-combustion type engine or a hybrid-type engine, and might not include the spark plug 112. In various implementations, the engine 102 may include one spark plug for each cylinder.

The combustion of the A/F mixture causes the piston to rotatably drive a crankshaft (not shown). The byproducts of combustion (i.e., exhaust) are expelled from the engine 102 to the exhaust system 114. The exhaust may include, among other things, exhaust vapor and oxygen. The oxygen ($O_2$) sensor 116 measures the concentration of oxygen in the exhaust system 114. The oxygen sensor 116 may be located anywhere in the exhaust system 114, such as upstream of a catalytic converter (not shown), downstream of the catalytic converter, or in an exhaust manifold (not shown). In various implementations the oxygen sensor 116 may be a planar-type or a conical-type oxygen sensor.

The oxygen sensor 116 outputs an oxygen ($O_2$) signal, which indicates the measured oxygen concentration. The ECM 220 may control the A/F mixture based on the output of the oxygen sensor 116. The ECM 220 may also control the A/F mixture based on the signals from the other sensors 122. The temperature of the oxygen sensor 116 may be low when the engine 102 is started, and therefore, the output of the oxygen sensor 116 may be unreliable. Accordingly, the ECM 220 may control the A/F mixture independent of the output of the oxygen sensor 116 until the output becomes reliable.

The oxygen sensor 116 includes a heater that receives power from the heater power supply 118. The ECM 220 includes a heating module 224 that controls application of power to the heater of the oxygen sensor 116 and, therefore, controls the temperature of the oxygen sensor 116. For example only, the heating module 224 may adjust the temperature of the oxygen sensor 116 by instructing the heater power supply 118 to increase or decrease the magnitude of power applied to the heater. Alternatively, the heating module 224 may adjust the temperature by instructing the heater power supply 118 to increase or decrease the duty cycle at which power is applied to the heater.

After engine startup, the heating module 224 instructs the heater power supply 118 to apply power to the heater of the oxygen sensor 116. In various implementations, engine startup may correspond to a time at which a driver instructs the ECM 220 to start the engine 102. The driver may instruct the ECM 220 to start the engine 102 by, for example, turning a key or pressing a button.

Like the temperature of the oxygen sensor 116, the temperature of the exhaust system 114 is likely low after engine startup. More specifically, the temperature of an interior surface of the exhaust system 114 is likely low after engine startup. In various implementations, the interior surface of the exhaust system 114 refers to any or all surfaces within the exhaust system 114 between the engine 102 and the oxygen sensor 116. For example only, the interior surface of the exhaust system 114 may include a surface located within the exhaust manifold, an exhaust pipe, and/or any other surface between the engine 102 and the oxygen sensor 116.

The temperature of the exhaust produced by the engine 102 is likely greater than the temperature of the interior surface of the exhaust system 114 after engine startup. The low temperature of the exhaust system 114 may cause passing exhaust vapor to condense and, therefore, condensation may be present on the interior surface of the exhaust system 114 after engine startup. More specifically, condensation may form when the temperature of the interior surface is less than the dew point (temperature) of the exhaust. Additionally, condensation may be present when the engine 102 is started due to, for example, the cooling of the exhaust system 114 after the engine 102 was previously shutdown.

If gas within the exhaust system 114 is less than the dew point, condensation may form due to the introduction of the warmer exhaust and the cooler gas within the exhaust system 114. This condensation may be deposited on the interior surface of the exhaust system 114. Condensation may also be present due to an increase in pressure within the exhaust system 114 created by, for example, the catalytic converter.

Drops or droplets of the condensation may contact the oxygen sensor 116 and, if so, may damage the oxygen sensor 116 if the temperature of the oxygen sensor 116 is greater than a first predetermined temperature. Accordingly, the heating module 224 adjusts the temperature of the oxygen sensor 116 to approximately the first predetermined temperature after engine startup. The first predetermined temperature may be calibratable and may be set to a temperature at which the oxygen sensor 116 will not be damaged if condensation contacts it. For example only, the first predetermined temperature may be 350° C.

The ECM 220 and/or the heating module 224 may determine the temperature of the oxygen sensor 116. In various implementations, the temperature of the oxygen sensor 116 may be determined based on the resistance of the heater. For example only, the ECM 220 may measure the voltage applied to the heater and the current through the heater and determine the resistance of the heater from the measured voltage and current. Alternatively, the temperature of the oxygen sensor 116 may be determined in any suitable manner, such as by a temperature sensor.

The exhaust system 114 and/or the oxygen sensor 116 may include a shielding device (not shown). The shielding device may shield the oxygen sensor 116 from being struck by condensation and/or other substances in the exhaust system 114. When the temperature of the shield is low (i.e., below the dew point of the exhaust), condensation may form on the shield.

However, maintaining the temperature of the oxygen sensor 116 at the first predetermined temperature may cause the temperature of the shield to reach the dew point at an earlier time than the exhaust system 114. As such, condensation may be unlikely to form on the shield at an earlier time than the exhaust system 114. Additionally, condensation formed elsewhere within the exhaust system 114 may then evaporate after contacting the shield.

As time passes after the engine 102 is started, air is drawn into the engine 102, and heat produced by combustion within the engine 102 heats the exhaust system 114. More specifically, combustion increases the temperature of the exhaust system 114. The temperature of the exhaust system 114 therefore increases as air is drawn into the engine 102.

As the temperature of the exhaust system 114 increases, condensation is less likely to form on the interior surface of the exhaust system 114. At a constant pressure, it is likely that condensation formation will end (until a later engine startup) when the temperature of the interior surface reaches the dew point of the exhaust. The condensation present on the interior surface then evaporates when the temperature of the interior surface is greater than the dew point. The rate at which the condensation evaporates may also increase as the temperature of the interior surface increases. The flow of the exhaust may also physically remove condensation from the exhaust system 114. Condensation may eventually be completely removed from the exhaust system 114 and the interior surface of the exhaust system 114 when a sufficient mass of air is drawn into the engine 102 after engine startup.

The heating module 224 determines an estimated mass (g) of air to be drawn into the engine 102 to remove condensation from the exhaust system 114 after engine startup. In various implementations, the estimated air mass may correspond to a mass of air to be drawn into the engine 102 to remove condensation from the interior surface of the exhaust system. The amount or percentage of condensation to be removed may be calibratable. For example only, the estimated air mass may be determined to completely remove condensation from the exhaust system 114. Accordingly, in various implementations the estimated air mass may correspond to a mass air that, once drawn into the engine 102, is estimated to completely remove condensation from the exhaust system 114.

In other implementations, the estimated air mass may be determined to remove a predetermined percentage of condensation from the exhaust system 114. This percentage may be calibratable and may be set such that, for example, condensation will likely be removed by the time that the temperature of the oxygen sensor 116 reaches potentially damaging temperatures.

The heating module 224 may determine the estimated air mass based on a coolant temperature, which may be measured by a coolant temperature (CT) sensor 230. Although the CT sensor 230 is depicted as within the engine 102, the CT sensor 230 may measure the coolant temperature at any location where the coolant is circulated, such as within a radiator.

The heating module 224 may also determine the estimated air mass based on other factors, such as the distance between the engine 102 and the oxygen sensor 116, the vapor concentration of the exhaust, and/or the temperature of the exhaust. Alternatively, the estimated air mass may be calibratable, and the heating module 224 may determine the estimated air mass from memory.

The heating module 224 receives a mass airflow (MAF) signal from a MAF sensor 232. The MAF signal indicates a measured mass of air (g) flowing into the engine 102 over a period of time (s). The heating module 224 determines a cumulative air mass (g) based on the MAF after engine startup. The cumulative air mass may correspond to the cumulative mass of air that has been ingested by the engine 102 after engine startup.

The heating module 224 determines an average MAF (g/s) based on the cumulative air mass and a period of time. For example, the period may be based on how much time has passed after engine startup. The heating module 224 determines a reduction factor (e.g., 0.4-1.0) based on the average MAF. For example only, the reduction factor may decrease as the average MAF increases. The heating module 224 adjusts the estimated air mass based on the reduction factor. More specifically, the heating module 224 reduces the estimated air mass based on the reduction factor.

The heating module 224 compares the estimated air mass with the cumulative air mass and adjusts the temperature of the oxygen sensor 116 to a second predetermined temperature when the cumulative air mass is greater than the estimated air mass. In this manner, the heating module 224 increases the temperature of the oxygen sensor 116 when it is likely that condensation has been removed from the exhaust system 114. The heating module 224 may then maintain the temperature of the oxygen sensor 116 at the second predetermined temperature. For example only, the second predetermined temperature may be 650° C.

Once the temperature of the oxygen sensor 116 reaches the second predetermined temperature, the output of the oxygen sensor 116 is likely reliable, and the ECM 220 may control the A/F mixture based on the output. In various implementations, however, the ECM 220 may begin controlling the A/F using the output when the temperature is equal to the first predetermined temperature. At the first predetermined temperature, the output of the oxygen sensor 116 may be delayed and/or the magnitude of the output may be decreased. Accordingly, the ECM 220 may adjust control of the A/F mixture based on knowledge of these characteristics.

Figure 3:
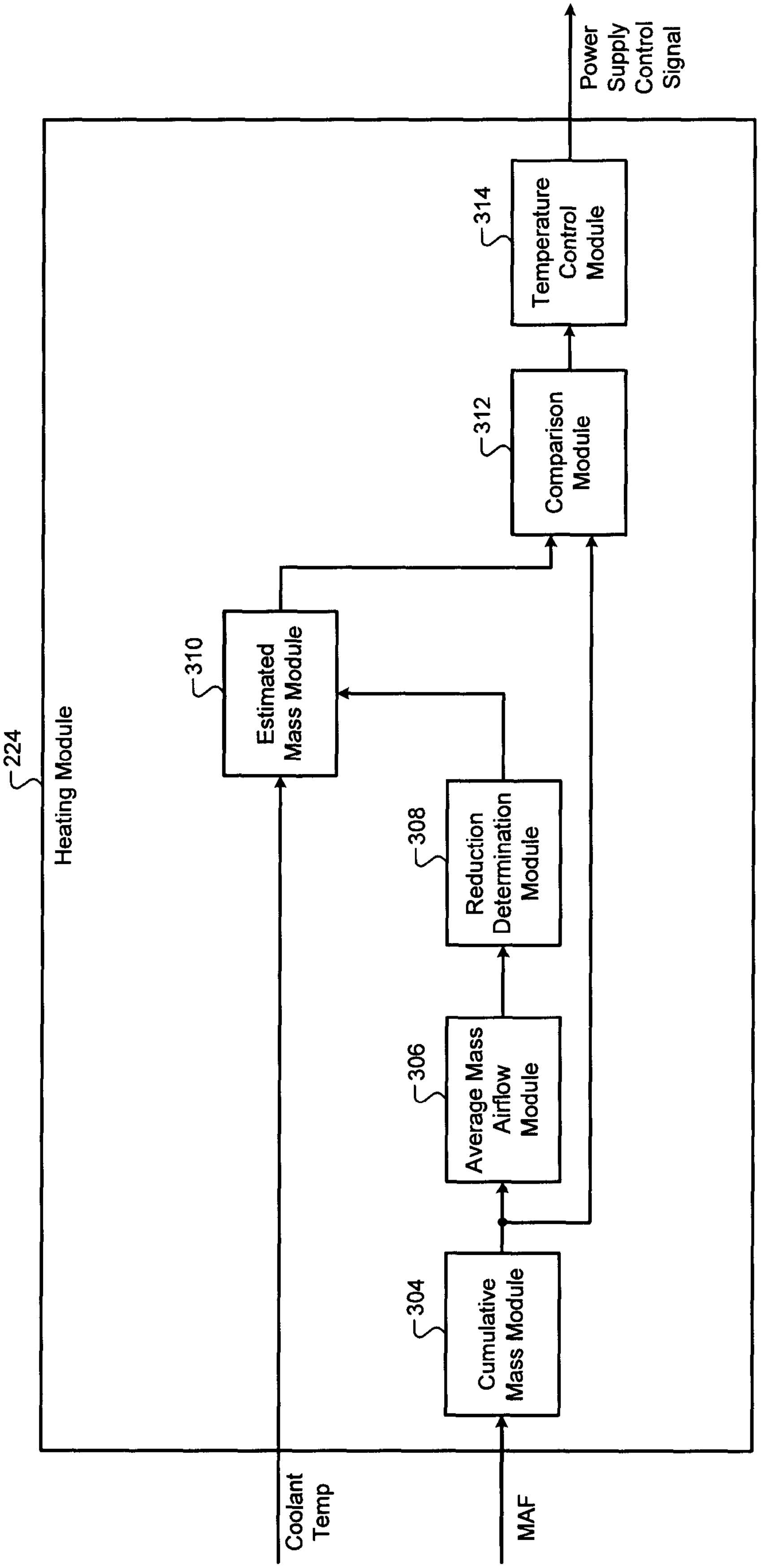
FIG. 3 is a functional block diagram of an exemplary heating module according to the principles of the present disclosure.

Referring now to FIG. 3, a functional block diagram of an exemplary implementation of the heating module 224 is presented. The heating module 224 includes a cumulative mass module 304, an average mass airflow (MAF) module 306, a reduction determination module 308, and an estimated mass module 310.

The cumulative mass module 304 receives the MAF signal from the MAF sensor 232 and determines the cumulative air mass (g) based on the MAF signal (g/s). For example only, the cumulative air mass may be determined by integrating the MAF at a predetermined rate and summing the individual MAF integrations. In various implementations, the predetermined rate may be once every 100 ms.

The average MAF module 306 determines the average MAF (g/s) based on the cumulative air mass (g) and the period of time (s) elapsed after engine startup. For example only, the average MAF may be expressed by the equation:

$$MAF_{AVG} = \frac{M_{CUM}}{t} \quad (1)$$

where $MAF_{AVG}$ is the average MAF, $M_{CUM}$ is the cumulative air mass, and t is the period of time elapsed after engine startup. In various implementations, the average MAF module 306 may determine the average MAF at a predetermined rate, such as once per second.

The reduction determination module 308 determines a reduction factor based on the average MAF. In various implementations, the reduction factor may be a value between approximately 0.4 and approximately 1.0, and the reduction factor may decrease as the average MAF increases. The reduction factor may be determined from, for example, a lookup table of reduction factor indexed by average MAF.

The estimated mass module 310 determines the estimated air mass (g) after engine startup. In various implementations, the estimated mass module 310 determines the estimated air mass based on the CT signal from the CT sensor 230. For example only, from a coolant temperature of 0.0° C., the estimated mass module 310 may determine that the estimated air mass is 400.0 g.

The estimated air mass may also be determined based on other factors, such as distance between the oxygen sensor 116 and the engine 102, the temperature of the exhaust, and/or the vapor concentration in the exhaust. In various implementations, the estimated air mass may be determined from a lookup table.

The estimated mass module 310 receives the reduction factor and adjusts the estimated air mass based on the reduction factor. For example only, the estimated mass module 310 may adjust the estimated air mass by multiplying the reduction factor by the estimated air mass. In this manner, the estimated mass module 310 may reduce the estimated air mass.

The heating module 224 also includes a comparison module 312 and a temperature control module 314. The comparison module 312 compares the cumulative air mass and the estimated air mass. The comparison module 312 indicates whether the condensation has been removed from the exhaust system 114 based on the comparison. For example only, the condensation may be removed from the exhaust system 114 when the cumulative air mass is greater than the estimated air mass.

The temperature control module 314 controls the temperature of the oxygen sensor 116. More specifically, the temperature control module 314 generates a power supply control signal, and the heater power supply 118 applies power to the heater of the oxygen sensor 116 based on the power supply control signal. In this manner, the temperature control module 314 controls the temperature of the oxygen sensor 116. The temperature control module 314 adjusts the temperature of the oxygen sensor 116 to the first predetermined temperature when the engine 102 is started.

The temperature control module 314 adjusts the temperature of the oxygen sensor 116 to the second predetermined temperature when the comparison module 312 indicates that the condensation has been removed from the exhaust system 114. For example only, the second predetermined temperature may be 650° C. Waiting for condensation to be removed from the exhaust system 114 may, among other things, aid in preventing oxygen sensor damage.

Figure 4:
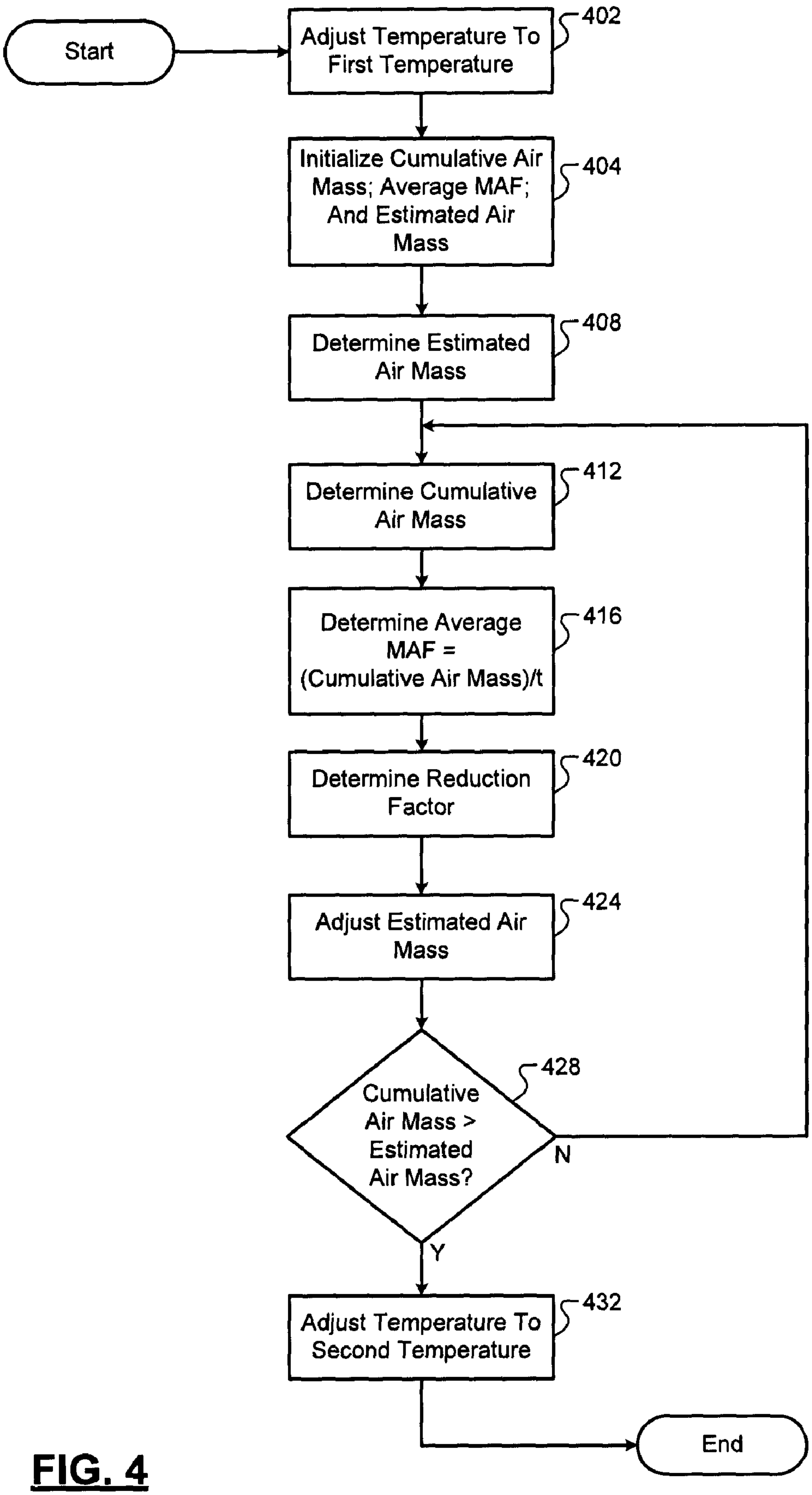
FIG. 4 is a flowchart depicting exemplary steps performed by the heating module according to the principles of the present disclosure.

Referring now to FIG. 4, a flowchart depicts exemplary steps performed by the heating module 224. Control begins when the engine 102 is started, and control continues in step 402 where control adjusts the temperature of the oxygen sensor 116 to the first predetermined temperature. For example only, the first predetermined temperature may be 350° C. In step 404, control initializes the heating module 224. For example, control may initialize the cumulative air mass, the average MAF, and/or the estimated air mass. In various implementations, control may initialize these parameters by setting them to a predetermined value, such as zero.

Control continues in step 408 where control determines the estimated air mass. For example only, control may determine the estimated air mass based on the CT signal from the CT sensor 230 and/or a lookup table. Additionally, control may determine the estimated air mass based on the distance between the oxygen sensor 116 and the engine 102, the temperature of the exhaust, and/or the vapor concentration of the exhaust. In various implementations, the estimated air mass may be a predetermined value.

In step 412, control determines the cumulative air mass. Control may determine the cumulative air mass at a predetermined rate, such as once every 100 ms. For example only, control may determine the cumulative air mass by integrating the MAF signal from the MAF sensor 232 at the predetermined rate and summing the individual MAF integrations.

Control then continues in step 416 where control determines the average MAF. For example only, the average MAF may be the cumulative air mass ingested by the engine 102 over the period of time since engine startup, as described by equation (1) above. In step 420, control determines the reduction factor. Control may determine the reduction factor based on, for example, the average MAF and a lookup table.

In step 424, control adjusts the estimated air mass based on the reduction factor. More specifically, control may reduce the estimated air mass based on the reduction factor. For example only, control may adjust the estimated air mass by multiplying the estimated air mass by the reduction factor. Control then continues in step 428 where control determines whether the cumulative air mass is greater than the estimated air mass. If so, control proceeds to step 432; otherwise, control returns to step 412.

In step 432, control adjusts the temperature of the oxygen sensor 116 to the second predetermined temperature and control ends. In this manner, control waits to heat the oxygen sensor 116 to the second predetermined temperature until after condensation has been removed from the the exhaust system 114. More specifically, control may until condensation has been removed from the interior surface of the exhaust system 114.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A heating module for an oxygen sensor, comprising:

an estimated mass module that determines an estimated mass of intake air to remove condensation from an exhaust system after startup of an engine;

a cumulative mass module that determines a cumulative mass of intake air after said engine startup; and a temperature control module configured to adjust a temperature sensor measuring oxygen in said exhaust system to a first predetermined temperature after said engine startup and that adjusts said temperature to a second predetermined temperature when said cumulative air mass is greater than said estimated air mass, wherein said second predetermined temperature is greater than said first predetermined temperature.

2. The heating module of claim 1 further comprising:

an average mass airflow module that determines an average mass airflow (MAF) based on said cumulative air mass over a period of time; and a reduction determination module that determines a reduction factor based on said average MAF, wherein said estimated mass module reduces said estimated air mass based on said reduction factor.

3. The heating module of claim 2 wherein said period begins at said engine startup.

4. The heating module of claim 1 wherein said estimated air mass is determined based on a coolant temperature.

5. The heating module of claim 1 wherein said estimated air mass is a predetermined value.

6. The heating module of claim 1 wherein said cumulative air mass is determined based on a measured mass of intake air.

7. The heating module of claim 1 wherein said temperature control module adjusts said temperature of said oxygen sensor by instructing a heater power supply to adjust at least one of a voltage and a current applied to a heater of said oxygen sensor.

8. The heating module of claim 1 wherein said estimated air mass is determined to remove condensation from an interior surface of said exhaust system after said engine startup.

9. The heating module of claim 8 wherein said interior surface comprises a surface within said exhaust system between said engine and said oxygen sensor.

10. A system comprising:

an engine control module comprising the heating module of claim 1; and the oxygen sensor comprising a heater, wherein said engine control module selectively adjusts an operating parameter of said engine based on an output of said oxygen sensor.

11. The system of claim 10 wherein said engine control module determines said temperature of said oxygen sensor and adjusts said operating parameter when said temperature is greater than said first predetermined temperature.

12. The system of claim 11 wherein said engine control module determines said temperature based on a resistance of said heater.

13. A method comprising:

determining an estimated mass of intake air to remove condensation from an exhaust system after startup of an engine;

determining a cumulative mass of intake air after said engine startup;

adjusting a temperature of an oxygen sensor measuring oxygen in said exhaust system to a first predetermined temperature after said engine startup; and adjusting said temperature to a second predetermined temperature when said cumulative air mass is greater than said estimated air mass, wherein said second predetermined temperature is greater than said first predetermined temperature.

14. The method of claim 13 further comprising:

determining an average mass airflow (MAF) based on said cumulative air mass over a period of time;

determining a reduction factor based on said average MAF; and reducing said estimated air mass based on said reduction factor.

15. The method of claim 14 wherein said period begins at said engine startup.

16. The method of claim 13 wherein said estimated air mass is determined based on a coolant temperature.

17. The method of claim 13 wherein said estimated air mass is a predetermined value.

18. The method of claim 13 wherein said cumulative air mass is determined based on a measured mass of intake air.

19. The method of claim 13 wherein said adjusting said temperature of said oxygen sensor comprises instructing a heater power supply to adjust at least one of a voltage and a current applied to a heater of said oxygen sensor.

20. The method of claim 13 wherein said estimated air mass is determined to remove condensation from an interior surface of said exhaust system after said engine startup.

21. The method of claim 20 wherein said interior surface comprises a surface within said exhaust system between said engine and said oxygen sensor.

22. The method of claim 13 further comprising selectively adjusting an operating parameter of said engine based on an output of said oxygen sensor.

23. The method of claim 22 further comprising:

determining said temperature of said oxygen sensor; and adjusting said operating parameter when said temperature is greater than said first predetermined temperature.

24. The method of claim 23 wherein said temperature is determined based on a resistance of a heater of said oxygen sensor.

* * * * *